US007955575B2

(12) United States Patent
Derand et al.

(10) Patent No.: US 7,955,575 B2
(45) Date of Patent: Jun. 7, 2011

(54) MICROFLUIDIC SURFACES

(75) Inventors: Helene Derand, Taby (SE); Anders Larsson, Bromma (SE); James Van Alstine, Stockholm (SE)

(73) Assignee: Gyros Patent AB, Uppsala (SE)

( * ) Notice: Subject to any disclaimer, the term of this patent is extended or adjusted under 35 U.S.C. 154(b) by 1967 days.

(21) Appl. No.: 10/069,827

(22) PCT Filed: Dec. 11, 2000

(86) PCT No.: PCT/EP00/12478

§ 371 (c)(1), (2), (4) Date: Feb. 26, 2002

(87) PCT Pub. No.: WO01/47637

PCT Pub. Date: Jul. 5, 2001

(65) Prior Publication Data

US 2002/0125135 A1 Sep. 12, 2002

(30) Foreign Application Priority Data

Dec. 23, 1999 (SE) ...................................... 9904802

(51) Int. Cl.
*G01N 27/26* (2006.01)
*G01F 17/00* (2006.01)

(52) U.S. Cl. ........ 422/504; 422/502; 422/535; 204/451; 204/455; 204/601; 204/605

(58) Field of Classification Search .......... 204/451–455, 204/601–605; 422/502, 504, 535
See application file for complete search history.

(56) References Cited

U.S. PATENT DOCUMENTS

| | | | | |
|---|---|---|---|---|
| 4,022,954 | A | 5/1977 | Kurosawa et al. | |
| 4,680,201 | A | 7/1987 | Hjerten | |
| 4,690,749 | A | 9/1987 | Van Alstine et al. | |
| 5,124,173 | A | 6/1992 | Uchiyama et al. | |
| 5,240,994 | A | 8/1993 | Brink et al. | |
| 5,250,613 | A | 10/1993 | Bergstrom et al. | |
| 5,376,252 | A | 12/1994 | Ekstrom | |
| 5,399,316 | A | 3/1995 | Yamada | |
| 5,690,841 | A | 11/1997 | Elderstig | |
| 5,773,488 | A | 6/1998 | Allmer | |
| 5,840,388 | A | 11/1998 | Karger et al. | |
| 5,858,188 | A | 1/1999 | Soane et al. | |
| 5,935,401 | A * | 8/1999 | Amigo | 204/454 |
| 5,958,202 | A * | 9/1999 | Regnier et al. | 204/451 |
| 5,962,081 | A | 10/1999 | Ohman | |
| 5,971,158 | A | 10/1999 | Yager et al. | |
| 5,995,209 | A | 11/1999 | Ohman | |
| 6,027,695 | A | 2/2000 | Oldenburg et al. | |
| 6,054,034 | A | 4/2000 | Soane et al. | |
| 6,126,765 | A | 10/2000 | Ohman | |
| 6,144,447 | A | 11/2000 | Ohman | |
| 6,183,829 | B1 * | 2/2001 | Daecher et al. | 428/64.1 |
| 6,192,768 | B1 | 2/2001 | Wallman et al. | |
| 6,203,291 | B1 | 3/2001 | Stemme | |
| 6,322,682 | B1 | 11/2001 | Arvidsson et al. | |
| 6,326,083 | B1 | 12/2001 | Yang et al. | |
| 6,444,461 | B1 | 9/2002 | Knapp et al. | |
| 6,454,970 | B1 | 9/2002 | Ohman | |
| 6,596,238 | B1 | 7/2003 | Belder et al. | |
| 6,620,478 | B1 | 9/2003 | Ove Ohman | |
| 6,632,656 | B1 | 10/2003 | Andersson | |
| 6,653,625 | B2 | 11/2003 | Andersson | |
| 6,717,136 | B2 | 4/2004 | Andersson | |
| 6,728,644 | B2 | 4/2004 | Bielik | |
| 6,811,736 | B1 | 11/2004 | Ohman | |
| 6,812,456 | B2 | 11/2004 | Andersson | |
| 6,812,457 | B2 | 11/2004 | Andersson | |
| 2002/0125135 | A1 | 9/2002 | Derand et al. | |
| 2003/0044322 | A1 | 3/2003 | Andersson | |
| 2003/0047823 | A1 | 3/2003 | Ohman | |
| 2003/0053934 | A1 | 3/2003 | Andersson et al. | |
| 2003/0054563 | A1 | 3/2003 | Ljungstrom | |
| 2003/0082075 | A1 | 5/2003 | Agren | |
| 2003/0094502 | A1 | 5/2003 | Andersson | |
| 2003/0129360 | A1 | 7/2003 | Derand | |
| 2003/0156763 | A1 | 8/2003 | Soderman | |
| 2003/0173650 | A1 | 9/2003 | Larsson et al. | |
| 2003/0211012 | A1 | 11/2003 | Bergstrom | |
| 2003/0213551 | A1 | 11/2003 | Derand | |
| 2003/0231312 | A1 | 12/2003 | Sjoberg | |

(Continued)

FOREIGN PATENT DOCUMENTS

AT 404099 1/1998

(Continued)

OTHER PUBLICATIONS

Bergström, K. et al. Effects of branching and molecular weight of surface-bound poly(ethylene oxide) on protein rejection; *Polymer Biomaterials, Eds*. Cooper, Bamfors, Tsuruta, VSP (1995) pp. 195-204.

Elbert, Donald and Jeffrey A. Hubbell; Surface Treatments of Polymers for Biocompatibility; Annu.Rev. Mater. Sci. 1996. 26: 365-94.

Holmberg, Krister and Gerard Quash; Control of Protein Adsorption in Solid-Phase Diagnostics and Therapeutics; *Biopolymers at Interferences*, Dekker 1998 (Surfactant Sciences Series 75) pp. 597-626.

Holmberg, K. and J.M. Harris; Poly(ethylene glycol) grafting as a way to prevent protein adsorption and bacterial adherence; *Mittal Festschrift, Eds Van Ooij, Anderson, VSP* (1998) pp. 443-460.

Abstract—Document No. RU2O15747.

(Continued)

*Primary Examiner* — Jeffrey T Barton
(74) *Attorney, Agent, or Firm* — Fulbright & Jaworski L.L.P.

(57) ABSTRACT

A microfluidic device comprising a set of one or more, preferably more than 5, covered microchannel structures manufactured in the surface of a planar substrate. The device is characterized in that a part surface of at least one of the microchannel structures has a coat exposing a non-ionic hydrophilic polymer. The non-ionic hydrophilic polymer is preferably attached covalently directly to the part surface or to a polymer skeleton that is attached to the surface.

32 Claims, No Drawings

U.S. PATENT DOCUMENTS

| | | | |
|---|---|---|---|
| 2004/0058408 | A1 | 3/2004 | Thomas |
| 2004/0067051 | A1 | 4/2004 | Kylberg et al. |
| 2004/0096867 | A1 | 5/2004 | Andersson |
| 2004/0099310 | A1 | 5/2004 | Andersson |
| 2004/0120856 | A1 | 6/2004 | Andersson et al. |
| 2004/0131345 | A1 | 7/2004 | Kylberg et al. |
| 2004/0202579 | A1 | 10/2004 | Larsson et al. |
| 2004/0239234 | A1 | 12/2004 | Andersson et al. |
| 2005/0153431 | A1 | 7/2005 | Andersson et al. |
| 2005/0153432 | A1 | 7/2005 | Andersson et al. |
| 2005/0153433 | A1 | 7/2005 | Andersson et al. |
| 2005/0153434 | A1 | 7/2005 | Andersson et al. |
| 2005/0186685 | A1 | 8/2005 | Kange et al. |
| 2005/0202471 | A1 | 9/2005 | Tooke et al. |

FOREIGN PATENT DOCUMENTS

| | | | |
|---|---|---|---|
| DE | 19753897.9 | | 6/1999 |
| EP | 0430248 | A2 | 6/1991 |
| EP | 1076239 | | 2/2001 |
| GB | 2238791 | | 6/1991 |
| GB | 2244276 | | 11/1991 |
| WO | WO-9618498 | | 6/1996 |
| WO | WO-9721090 | | 6/1997 |
| WO | WO 98/00709 | | 1/1998 |
| WO | WO-9827423 | | 6/1998 |
| WO | WO-9855231 | | 12/1998 |
| WO | WO-9919717 | | 4/1999 |
| WO | WO 99/58245 | | 11/1999 |
| WO | WO-9958245 | | 11/1999 |

OTHER PUBLICATIONS

Burns, Norman L. et al. "Poly(ethylene glycol) Grafted to Quartz: Analysis in Terms of a Site-Dissociation Model of Electroosmotic Fluid Flow", *Langmuir*, vol. 11, No. 7, 1995, pp. 2768-2776.

Emoto Kazunori, et al. "Electrokinetic Analysis of Poly(ethylene glycol) Coating Chemistry"; *Analysis of Peg Coating Chemistry*; Chapter 24, pp. 374-398.

Van Alstine, James M. et al. "Polymer coatings for Improved Crystal Growth"; Colloids and Surfaces: *Colloids and Surfaces B: Biointerfaces*, vol. 14, 1999; pp. 197-211.

Malmsten, Martin et al., Effect of Chain Density on Inhibition of Protein Adsorption by Poly(ethylene glycol) Based Coatings; *Journal of Colloid and Interface Science*, vol. 202, 1998, pp. 507-517.

Knox, Robert J. et al., "Automated Particle Electrophoresis: Modeling and Control of Adverse Chamber Surface Properties"; *Analytical Chemistry*; vol. 70, No. 11, Jun. 1, 1998; pp. 2268-2278.

Gyros AB, The Technology Platform: Integrating Microfluidics; pp. 7-8.

Holmberg, Krister et al., Effects on protein adsorption, bacterial adhesion and contact angle of grafting PEG chains to polystyrene; *J. Adhesion Science Technology*; vol. 7. No. 6, 1993, pp. 503-517.

Bell, Darrel J. et al., "Using poly(ethylene glycol) silane to prevent protein adsorption in microfabricated silicon channels"; *SPIE*, vol. 3258: pp. 134-140.

U.S. Appl. No. 09/937,533, Larsson et al.
U.S. Appl. No. 10/169,056, Andersson et al.
U.S. Appl. No. 10/276,282, Larsson et al.
U.S. Appl. No. 10/402,138, Kylberg et al.
U.S. Appl. No. 09/958,577, Ulfendahl.
U.S. Appl. No. 09/869,554, Orlefors et al.
U.S. Appl. No. 09/830,475, Stjernstrom.
U.S. Appl. No. 10/168,942, Tooke et al.
U.S. Appl. No. 10/957,452, Ekstrand et al.
U.S. Appl. No. 10/070,912, Ohman et al.
U.S. Appl. No. 10/402,137, Kylberg et al.
U.S. Appl. No. 10/030,297, Derand et al.
U.S. Appl. No. 10/924,151, Tooke et al.
U.S. Appl. No. 10/513,084, Holmquest et al.
U.S. Appl. No. 09/937,533, Derand et al.
U.S. Appl. No. 10/999,532, Ostlin et al.
U.S. Appl. No. 10/867,893, Derand et al.
U.S. Appl. No. 11/017,252, Derand et al.
U.S. Appl. No. 10/182,792, Derand et al.
U.S. Appl. No. 10/450,177, Ohman et al.
U.S. Appl. No. 10/129,032, Tormod.
U.S. Appl. No. 09/674,457, Larsson et al.
U.S. Appl. No. 10/244,667, Agren.
U.S. Appl. No. 10/849,321, Fielden et al.
U.S. Appl. No. 10/111,822, Tooke et al.
U.S. Appl. No. 09/830,795,filed Oct. 29, 1999 Stjernstrom.
U.S. Appl. No. 09/830,795, Gyros.
U.S. Appl. No. 10/069,827, Gyros.
U.S. Appl. No. 11/034,539, Gyros.
U.S. Appl. No. 11/010,869, Gyros.
U.S. Appl. No. 11/010,870, Gyros.
U.S. Appl. No. 11/010,957, Gyros.
U.S. Appl. No. 11/010,977, Gyros.
U.S. Appl. No. 11/038,712, Gyros.

Bergstroem et al., "Effect of Polymerization Conditions when Making Norbornene—Ethylene Coplolymers using the Metallocene Catalyst Ethylene Bis (Indenyl) Zircomium Dichloride and Mao to Obtain High Glass Transition Temperature," *J. Applied Polymer Science*, 63(8): 1063-1070, 1997.

* cited by examiner

MICROFLUIDIC SURFACES

TECHNICAL FIELD

The invention concerns a microfluidic device comprising a set of one or more, preferably more than 5, covered microchannel structures fabricated in the surface of a planar substrate.

By the term "covered" is meant that a lid covers the microchannel structures thereby minimising or preventing undesired evaporation of liquids. The cover/lid may have microstructures matching each microchannel structure in the substrate surface.

The term "fabricated" means that two-dimensional and/or three-dimensional microstructures are present in the surface. The difference between a two-dimensional and a three-dimensional microstructure is that in the former variant there are no physical barriers delineating the structure while in the latter variant there are. See for instance WO 9958245 (Larsson et al).

The part of the cover/lid, which is facing the interior of a microchannel is included in the surface of a microchannel structure.

The planar substrate typically is made of inorganic and/or organic material, preferably of plastics. For examples of various inorganic and organic materials see under the heading "Material in the microfluidic device".

A microfluidic device encompasses that there is a liquid flow that causes mass transport of solutes and/or particles dispersed in the liquid from one functional part of the structure to another. Sole capillaries, possibly with an area for application and an area for detection, as used in capillary electrophoresis in which solutes are caused to migrate by an applied electric field for separation purposes are not microfluidic devices as contemplated in the context of the invention. An electrophoresis capillary may, however, be part of a microfluidic device if the capillary is part of a microchannel structure in which there are one or more additional functional parts from and/or to which mass transport of a solute by a liquid flow is taking place as defined above.

The liquid is typically polar, for instance aqueous such as water.

TECHNICAL BACKGROUND

Microfluidic devices require that liquid flow easily pass through the channels and that non-specific adsorption of reagents and analytes should be as low as possible, i.e. insignificant for the reactions to be carried out.

Reagents and/or analytes includes proteins, nucleic acids, carbohydrates, cells, cell particles, bacteria, viruses etc. Proteins include any compound exhibiting poly- or oligopeptide structure.

The hydrophilicity of surfaces within microchannel structures shall support reproducible and predetermined penetration of an aqueous liquid into the various parts of a structure. It is desirable that once the liquid has passed a possible break at the entrance of a part of the structure then the liquid spontaneously shall enter the part by capillary action (passive movement). This in turn means that the hydrophilicity of the surfaces within microchannel structures becomes of increasing importance when going from a macroformat to a microformat.

From our experience, water contact angles around 20 degrees or lower may often be needed to accomplish reliable passive fluid movement into microchannel structures. However, it is not simple to manufacture surfaces which permanently have such low water contact angles. There is often a tendency for a change in water contact angles during storage, which renders it difficult to market microfluidic devices having standardised flow properties.

The situation is complicated by the fact that methods for preparing surfaces with very low water contact angles do not necessarily reduce the ability to non-specifically adsorb reagents and sample constituents. The surface/volume ratio increases when going from a macroformat down to smaller formats. This means that the capacity for non-specific adsorption of a surface increases inversely with the volume surrounded by the surface. Non-specific adsorption therefore becomes more critical in microformat devices than in larger devices.

An unacceptable non-specific adsorption of biomolecules is often associated with the presence of hydrophobic surface structures. This particular problem therefore is often more severe in relation to surfaces made of plastics and other hydrophobic materials compared to surfaces of native silicon surfaces and other similar inorganic materials.

There are a number of methods available for treating surfaces to make them hydrophilic in order to reduce non-specific adsorption of various kinds of biomolecules and other reagents. However, these methods generally do not concern balancing a low non-specific adsorption with a reliable and reproducible liquid flow when miniaturizing macroformats down into microformats. Compare for instance Elbert et al., (Annu. Rev. Mater. Sci. 26 (1996) 365-394).

Surfaces that have been rendered repelling for biopolymers in general by coating with adducts between polyethylenimines and hydrophilic polymers have been described during the last decade (Brink et al (U.S. Pat. No. 5,240,994), Bergström et al., U.S. Pat. No. 5,250,613; Holmberg et al., J. Adhesion Sci. Technol. 7(6) (1993) 503-517; Bergström et al., Polymer Biomaterials, Eds Cooper, Bamfors, Tsuruta, VSP (1995) 195-204; Holmberg et al., Mittal Festschrift, Eds Van Ooij, Anderson, VSP 1998, p 443-460; and Holmberg et al., Biopolymers at Interfaces, Dekker 1998 (Surfactant Science Series 75), 597-626). Sequential attachment of a polyethylenimine and a hydrophilic polymer has also been described (Kiss et al., Prog. Colloid Polym. Sci. 74 (1987) 113-119).

Non-specific adsorption and/or electroendosmosis have been controlled in capillary electrophoresis by coating the inner surface of the capillary used with a hydrophilic layer, typically in form of a hydrophilic polymer (e.g. van Alstine et al U.S. Pat. No. 4,690,749; Ekström & Arvidsson WO 9800709; Hjertén, U.S. Pat. No. 4,680,201 (poly methacrylamide); Karger et al., U.S. Pat. No. 5,840,388 (polyvinyl alcohol (PVA)); and Soane et al., U.S. Pat. No. 5,858,188 and U.S. Pat. No. 6,054,034 (acrylic microchannels). Capillary electrophoresis is a common name for separation techniques carried out in a narrow capillary utilizing an applied electric filed for mass transport and separation of the analytes.

Larsson et al (WO 9958245, Amersham Pharmacia Biotech) presents among others a microfluidic device in which microchannels between two planar substrates are defined by the interface between hydrophilic and hydrophobic areas in at least one of the substrates. For aqueous liquids the hydrophilic areas define the fluid pathways. Various ways of obtaining a pattern of hydrophobic and hydrophilic surfaces for different purposes are discussed, for instance, plasma treatment, coating a hydrophobic surfaces with a hydrophilic polymer etc. The hydrophilic coat polymers suggested may or may not have aryl groups suggesting that Larsson et al are not focusing on lowering the water contact angle as much as possible or avoiding non-specific adsorption.

Larsson, Ocklind and Derand (PCT/EP00/05193 claiming priority from SE 9901100-9, filed Mar. 24, 1999) describe the production of highly hydrophilic surfaces made of plastics. The surfaces retain their hydrophilicity even after being in contact with aqueous liquids. An additional issue in PCT/EP00/05193 is to balance a permanent hydrophilicity with good cell attachment properties. The surfaces are primarily suggested to be used in microfabricated devices.

Polyethylene glycol has been linked directly to the surface of a microchannel fabricated in silicone for testing the ability of polyethylyne glycol to prevent protein adsorption. See Bell, Brody and Yager (SPIE-Int. Soc. Opt. Eng. (1998) 3258 (Micro- and Nanofabricated Structures and Devices for Biomedical Environmental Applications) 134-140).

THE OBJECTIVES OF THE INVENTION

A first objective is to accomplish a sufficiently reliable and reproducible mass transport of reagents and sample constituents (e.g. analytes) in microfluidic devices.

A second objective is to enable a reliable and reproducible aqueous liquid flow in the microfluidic devices.

A third objective is to optimise non-specific adsorption and hydrophilicity in relation to each other for surfaces of fluid pathways in microfluidic devices.

THE INVENTION

We have discovered that by attaching a hydrophilic non-ionic polymer to the surface of a microchannel structure in a microfluidic device one can easily minimize the above-mentioned problems also for the most critical surface materials. This discovery facilitates creation of surfaces that permit reliable and reproducible transport of reagents and sample constituents in microfluidic devices.

The main aspect of the invention is a microfluidic device as defined under the heading “Technical Field”. The characterizing feature is that at least a part surface of each microchannel structure exposes a firmly attached non-ionic hydrophilic polymer to the interior of the structure.

The non-ionic hydrophilic polymer may be attached directly to the surface of the microchannel structure or via a polymer skeleton that in turn is attached to the surface via multipoint attachment.

The Non-ionic Hydrophilic Polymer

The, non-ionic hydrophilic polymer contains a plurality of hydrophilic neutral groups. Neutral groups excludes non-charged groups that can be charged by a pH-change. Typical neutral hydrophilic groups contains an heteroatom (oxygen, sulphur or nitrogen) and may be selected among hydroxy, ether such as ethylene oxy (e.g. in polyethylene oxide), amides that may be N-substituted etc. The polymer as such is also inert towards the reagents and chemicals that are to be used in the microfluidic device.

Illustrative non-ionic hydrophilic polymers are preferably water-soluble when not bound to a surface. Their molecular weight is within the range from about 400 to about 1,000,000 daltons, preferably from about 1,000 to about 200,000, such as below 100,000 daltons.

Non-ionic hydrophilic polymers are illustrated with polyethylene glycol, or more or less randomly distributed or block-distributed homo- and copolymers of lower alkylene oxides ($C_{1-10}$, such as $C_{2-10}$) or lower alkylene ($C_{1-10}$, such as $C_{2-10}$) bisepoxides in which the epoxide groups are linked together via a carbon chain comprising 2-10 $sp^3$-carbons. The carbon chain may be interrupted at one or more positions by an ether oxygen, i.e. an ether oxygen is inserted between two carbon atoms. A hydrogen atom at one or more of the methylene groups may be replaced with hydroxy groups or lower alkoxy groups ($C_{1-4}$). For stability reasons at most one oxygen atom should be bound to one and the same carbon atom.

Other suitable non-ionic hydrophilic polymers are polyhydroxy polymers that may be completely or partly natural or completely synthetic.

Completely or partly natural polyhydroxy polymers are represented by polysaccharides, such as dextran and its water-soluble derivatives, water-soluble derivatives of starch, and water-soluble derivatives of cellulose, such as certain cellulose ethers. Potentially interesting cellulose ethers are methyl cellulose, methyl hydroxy propyl cellulose, and ethyl hydroxy ethyl cellulose.

Synthetic polyhydroxy polymers of interest are also polyvinyl alcohol possibly in partly acetylated form, poly(hydroxy lower alkyl vinyl ether) polymers, polymers obtained by polymerisation of epichlorohydrin, glycidol and similar bifunctionally reactive monomers giving polyhydroxy polymers.

Polyvinylpyrrolidone (PVP), polyacrylamides, polymethacrylamides etc are examples of polymers in which there are a plurality of amide groups.

Further suitable hydrophilic polymers are reaction products (adducts) between ethylene oxide, optionally in combination with higher alkylene oxides or bisepoxides, or tetrahydrofuran, and a dihydroxy or polyhydroxy compound as illustrated with glycerol, pentaerythritol and any of the polyhydroxy polymers referred to in the preceding paragraphs.

The non-ionic hydrophilic polymer may have the same structure as described for the extenders defined in Berg et al (WO 9833572) which is hereby incorporated by reference. In contrast to Berg et al there is no imperative need for the presence of an affinity ligand on the hydrophilic polymer used in the present invention.

One or more positions in the non-ionic hydrophilic polymer may be utilized for attachment. In order to make the hydrophilic polymer flexible the number of attachment points should be as low as possible, for instance one, two or three positions per polymer molecule. For straight chain polymers, such as lower alkylene oxide polymers similar to polyethylene oxide, the number of attachment points is typically one or two, with preference for one.

Depending on the position of a coated part surface within a microchannel structure, the hydrophilic polymer may carry an immobilized reactant (often called ligand when affinity reactions are concerned). Depending on the particular use of a microchannel structure such reactants can be so called affinity reactants that are used to catch an analyte or an added reactant or a contaminant present in the sample. Immobilized ligands also include immobilized enzymes. According to the invention this kind of reactants are preferably present in reaction chambers/cavities (see below).

The Skeleton

The skeleton may be an organic or inorganic cationic, anionic or neutral polymer of inorganic or organic material. With respect to inorganic skeletons, the preferred variants are polymers such as silicon oxide. See the experimental part.

With respect to organic skeletons, the preferred variants are cationic polymers, such as a polyamine, i.e. a polymer containing two or more primary, secondary or tertiary amine groups or quaternary ammonium groups. The preferred polyamines are polyalkylenimines, i.e. polymers in which amine groups are interlinked by alkylene chains. The alkylene chains are for instance selected among $C_{1-6}$ alkylene chains. The alkylene chains may carry neutral hydrophilic groups, for instance hydroxy (HO) or poly (including oligo) lower alkylene oxy groups [—O—$((C_2H_4)_nO)_mH$ where n is 1-5 and m is from 1 and upwards for instance ≦100 or ≦50)], amide groups, acyl, acyloxy, lower alkyl (for instance $C_{1-5}$) and other neutral groups and/or groups that are unreactive under the conditions to be applied in the microfluidic device.

The preferred molecular weight of the skeleton including polyamine skeletons is within the range of 10,000-3,000,000 daltons, preferably about 50,000-2,000,000 daltons. The structure of the skeleton can be linear, branched, hyperbranched or dendritic. The preferred polyamine skeleton is polyethylenimine, a compound that is achievable e.g. by polymerizing ethylene imine, usually giving hyperbranched chains.

Attachment of the Non-ionic Hydrophilic Polymer

The introduction of the non-ionic hydrophilic polymer groups on the channel surfaces may be done according to principles well-known in the field, forinstance by directly attaching the hydrophilic polymer to the desired part surface or via the kind of skeleton discussed above. The adduct between the skeleton and the non-ionic hydrophilic polymer may be (i) formed separately before it is attached to the surface or (ii) on the surface by first attaching the skeleton and then the hydrophilic polymer. Alternative (ii) can be carried out by (a) grafting a preprepared non-ionic hydrophilic polymer to the skeleton or (b) graft polymerisation of suitable monomers.

Both the non-ionic hydrophilic polymer and the skeleton may be stabilized to the underlying surfaces via covalent bonds, electrostatic interaction etc and/or by cross-linking in situ or afterwards. A polyamine skeleton, for instance, may be attached covalently by reacting its amine functions with aminereactive groups that are originally present or have been introduced on the uncoated substrate surface. It is important that the nude part surface to be coated according to the invention has groups, which enable stable interaction between the non-ionic hydrophilic polymer and the surface and between the skeleton and the surface. Cationic skeletons, for instance polyamines, require that negatively charged or chargeable groups or groups otherwise capable of binding to amine groups, typically hydrophilic, are exposed on the surface. Polar and/or charged or chargeable groups may easily be introduced on plastics surfaces, for instance by treatment with $O_2$- and acrylic acid-containing plasmas, by oxidation with permanaganate or bichromate in concentrated sulphuric acid, by coating with polymers containing these type of groups etc. In other words by techniques well-known in the scientific and patent literature. The plastics surface as such may also contain this kind of groups without any pretreatment, i.e. by being obtained from polymerisation of monomers either carrying the above-mentioned type of groups or groups that subsequent to polymerisation easily can be transformed to such groups.

If the surface to be coated is made of a metal, for instance of gold or platina, and the non-ionic hydrophilic polymer or skeleton has thiol groups, attachment can be accomplished via bonds that are partly covalent.

If the non-ionic hydrophilic polymer or the skeleton have hydrocarbon groups, for instance pure alkyl groups or phenyl groups, one can envisage that attachment to the substrate surface can take place via hydrophobic interactions.

Water Contact Angles

The optimal water contact angle depends on the analyses and reactions to be carried out in the microchannel structure, dimensions of the microchannels and chambers of the structures, composition and surface tension of liquids used, etc. As a rule of thumb, the inventive coat should be selected to provide a water contact angle that is ≦30°, such as ≦25° or ≦20°. These figures refer to values obtained at the temperature of use, primarily room temperature.

So far the most superior surfaces have been those based on adducts between polyethylene imine and polyethylene glycol with monosite (mono group terminal) attachment of the nonionic hydrophilic polymer to the polyethylene imine skeleton. The best mode to date of this preferred variant is given in the experimental part (example 1).

Thickness of the Coat

The thickness of the hydrated coat provided by the nonionic hydrophilic polymers should be ≦50%, for instance ≦20% of the smallest distance between two opposing sides of a part of the microchannel structure comprising the surface coated according to the invention. This typically means that an optimal thickness will be within the interval 0.1-1000 nm, for instance 1-100 nm, with the provision that the coat shall permit a desired flow to pass through.

Structures in the Microfluidic Device.

The microfluidic device may be disc-formed of various geometries, with the round form being the preferred variant (CD-form).

On devices having round forms, the microchannel structures may be arranged radially with an intended flow direction from an inner application area radially towards the periphery of the disc. In this variant the most practical ways of driving the flow is by capillary action, centripetal force (spinning the disc) and/or hydrodynamically.

Each microchannel structure comprises one or more channels and/or one or more cavities in the microformat. Different parts of a structure may have different discrete functions. Thus there may be one or more parts that function as (a) application chamber/cavity/area (b) conduit for liquid transport, (c) reaction chamber/cavity, (d) volume defining unit, (e) mixing chamber/cavity, (f) chamber for separating components in the sample, for instance by capillary electrophoresis, chromatography and the like (g) detection chamber/cavity, (h) waste conduit/chamber/cavity etc. According to the invention at least one of these parts may have the inventive coat on its surface, i.e. corresponds to the part surface discussed above.

When the structure is used, necessary reagents and/or sample including the analyte are applied to an application area and transported downstream in the structure by an applied liquid flow. Some of the reagents may have been predispensed to a chamber/cavity. The liquid flow may be driven by capillary forces, and/or centripetal force, pressure differences applied externally over a microchannel structure and also other non-electrokinetic forces that are externally applied and cause transport of the liquid and the analytes and reagents in the same direction. The liquid flow may also be driven by pressure generated by electroendoosmosis created within the structure. The liquid flow will thus transport reagents and analytes and other constituents from an application area/cavity/chamber into a sequence comprising a particular order of preselected parts (b)-(h). The liquid flow may be paused when a reagent and/or analyte have reached a preselected part in which they are subjected to a certain procedure, for instance capillary electrophoresis in a separation part, a reaction in a reaction part, detection in a detection part etc.

Analytical and preparative methods as discussed below utilizing the microfluidic device of the invention with transport of liquid, reagents and analytes as described in the preceding paragraph constitute a separate aspect of the invention.

Microformat means that at least one liquid conduit in the structure has a depth and/or width that is in the microformat range, i.e. $<10^3$ μm, preferably $<10^2$ μm. Each microchannel structure extends in a common plane of the planar substrate material. In addition there may be extensions in other directions, primarily perpendicular to the common plane. Such other extensions may function as sample or liquid application areas or connections to other microchannel structures that are not located in the common plane, for instance.

The distance between two opposite walls in a channel is <1000 μm, such as <100 μm, or even ≦10 μm, such as ≦1 μm. The structures may also contain one or more chambers or cavities connected to the channels and having volumes being ≦500 μl, such as ≦100 μl and even ≦10 μl such as ≦1 μl. The depths of the chambers/cavities may typically be in the interval ≦1000 μm such as ≦100 μm such as ≦10 μm or even ≦1 μm. The lower limit is always significantly greater than the largest of the reagents used. The lower limits of chambers and channels are typically in the range 0.1-0.01 μm for devices that are to be delivered in dry form.

It is believed that the preferred variants of the inventive microfluidic devices will be delivered to the customer in a dried state. The surfaces of the microchannel structures of the device therefore should have a hydrophilicity sufficient to permit the aqueous liquid to be used to penetrate the different parts of the channels of the structure by capillary forces (self-suction).

There may be conduits enabling liquid communication between individual microchannel structures within a set.

Material in the Microfluidic Device.

The surface to be coated according to the invention typically is made of inorganic and/or organic material, preferably of plastics. Diamond material and other forms of elemental carbon are included in the term organic material. Among suitable inorganic surface materials can be mentioned metal surfaces, e.g. made of gold, platina etc.

Plastics to be coated according to the invention may have been obtained by polymerisation of monomers comprising unsaturation such as carbon-carbon double bonds and/or carbon-carbon-triple bonds.

The monomers may, for instance, be selected from mono-, di and poly/oligo-unsaturated compounds, e.g. vinyl compounds and other compounds containing unsaturation. Illustrative monomers are:

(i) alkenes/alkadienes (such as ethylene, butadiene, propylene and including substituted forms such as vinyl ethers), cycloalkenes, polyfluorovinyl hydrocarbons (for instance tetrafluoroethylene), alkene-containing acids, esters, amides, nitrites etc for instance various methacryl/acryl compounds; and (ii) vinyl aryl compounds (such as mono-, di- and trivinyl benzenes) that optionally may be substituted with for instance lower alkyl groups (C1-6) etc.

Another type of plastics are based on condensation polymers in which the monomers are selected from compounds exhibiting two or more groups selected among amino, hydroxy, carboxy etc groups. Particularly emphasised monomers are polyamino monomers, polycarboxy monomers (including corresponding reactive halides, esters and anhydrides), poly hydroxy monomers, amino-carboxy monomers, amino-hydroxy monomers and hydroxy-carboxy monomers, in which poly stands for two, three or more functional groups. Polyfunctional compounds include compounds having a functional group that is reactive twice, for instance carbonic acid or formaldehyde. The plastics contemplated are typically polycarbonates, polyamides, polyamines, polyethers etc. Polyethers include the corresponding silicon analogues, such as silicone rubber.

The polymers of the plastics may be in cross-linked form.

The plastics may be a mixture of two or more different polymer(s)/copolymer(s).

Particularly interesting plastics are those that have a non-significant fluorescence for excitation wavelengths in the interval 200-800 nm and emission wavelengths in the interval 400-900 nm. By non-significant fluorescence is meant that the fluorescence intensity in the above-given emission wavelength interval should be below 50% of the fluorescence intensity for a reference plastics (=a polycarbonate of bisphenol A without fluorescent additives). In fact it does not harm in case the fluorescence intensity of the plastics is even lower, such as <30% or <15%, such as <5% or <1%, of the fluorescence intensity of the reference plastics. Typical plastics having an acceptable fluorescence are based on polymers of aliphatic monomers containing polymerizable carbon-carbon double bonds, such as polymers of cykloalkenes (e.g. norbornene och substituted norbornenes), ethylene, propylenes etc, as well as other non-aromatic polymers of high purity, e.g. certain grades of polymethylmethacrylate.

In preferred variants of the invention the same limits for fluorescence also apply to the microfluidic structure after having been coated in accordance with the invention.

Applications in which the Inventive Microfluidic Device can be used.

The primary use of the microfluidic devices of the invention is in analytical and preparative chemical and biochemical systems.

Typical analytical systems in which the microfluidic systems described herein may comprise as the main steps one or more of (a) sample preparation, (b) assay reactions and (c) detection. Sample preparation means the preparation of a sample in order to make it suitable for the assay reactions and/or for the detection of a certain activity or molecular entity. This may for example mean that substances interfering with the assay reactions and/or detection is removed or otherwise neutralized, that substances are amplified and/or derivatized etc. Typical examples are (1) amplifying one or more nucleic acid sequences in a sample, for instance by polymerase chain reaction (PCR), (2) removing of species cross-reacting with an analyte in assays involving affinity reactions etc. Typical assay reactions are (i) reactions involving cells, (ii) affinity reactions, for instance biospecific affinity including immune reactions, enzymatic reactions, hybridization/annealing etc, (iii) precipitation reactions, (iv) pure chemical reactions involving formation or breaking up of covalent bonds, etc. The detection reaction may involve fluorometry, chemiluminometry, mass spectrometry, nephelometry, turbidometry etc. The detection reaction aims at detection of the result of the assay reaction(s) and at relating a found result with the qualitative or quantitative presence of an activity in the original sample. The activity can be a biological, a chemical, a biochemical etc activity. It may be as the presence of a compound as such or simply as an activity of a known or unknown compound. If the system is used for diagnostic purposes the result in the detection step is further correlated to the medicinal status of the individual from which the sample derives. The applicable analytical systems may thus comprise affinity assays, such as immune assays, hybridisation assays, cell biology assays, mutation detection, genome characterisation, enzyme assays, screening assays for finding new affinity pairs etc. Methods for the analysis of sample content of proteins, nucleic acids, carbohydrates, lipids and other molecules with particular emphasis of other bio-organic molecules are also included.

The microfluidic device of the present invention may also find use for the set up of libraries of compounds including synthetic peptide and oligonucleotide libraries, for instance by solid phase synthesis. The synthesis of so called combinatorial libraries of compounds is also included.

The invention will now be described with reference to non-limitative experiments that function as proof of principle.

EXPERIMENTAL PART a. Coat of Peg-Pei Adduct a. Synthesis of Peg-Pei Adduct 0.43 g of polyethylenimine (Polymin SN from BASF, Germany) was dissolved in 45 ml of 50 mM sodium borate buffer (pH 9.5) at 45° C. 5 g of the glycidyl ether of monomethoxy polyethylene glycol (Mw 5 000) was added during stirring and the mixture was stirred for 3 h at 45° C.

b. Surface Treatment

A polycarbonate CD disc (polycarbonate of Bisphenol A, Macrolon DP-1265, Bayer AG, Germany) with a recessed microchannel pattern was placed in a plasma reactor (Plasma Science PS0500, BOC Coating Technology, USA) and treated with an oxygen plasma at 5 sccm gas flow and 500 W RF power for 10 min. After venting the reactor, the disc was immersed in a 0.1% solution of the PEG-PEI adduct in borate buffer pH 9.5 for 1 h. The disc was then rinsed with distilled water, blown dry with nitrogen and the water contact angle (sessile drop) was measured on a Ramé-Hart manual goniometer bench. The average of six equilibrium measurements (three droplets) was 24 degrees. An XPS spectrum of the treated surface gave the following molar elemental composition: 73.2% C, 3.7% N, 23.1% O, showing that the surface was essentially covered by the adsorbed PEG-PEI adduct.

c. Capillary Wetting

Another polycarbonate CD disc of the same material as above with a recessed microchannel pattern was treated as in example 2. It was then covered with a thin silicone rubber lid, with a hole placed over a microchannel. When a droplet of water was placed in the hole with a micropipette, the water was drawn in by capillary forces and penetrated the entire accessible channel system.

d. Comparative Examples of Surface Treatments a) A polycarbonate disc of the same material as above with a recessed microchannel pattern was dipped into a 0.5% water solution of phenyl dextran (degree of substitution: 0.2 per monosacharide unit of dextran, Mw 40 000) for 1 h. After water rinsing, the disc was blown dry with nitrogen. The water contact angle was 30 degrees. When a silicone rubber lid was placed over the disc with a hole over a channel, the droplet was not spontaneously drawn in. When a vacuum was applied to the channel through another hole in the lid, the droplet could however be introduced by suction.

b) A polycarbonate disc of the same material as above with a recessed microchannel pattern was immersed over night in a 1% water solution of a polyethylene glycol "polypropylene glycol" polyethylene glycol triblock copolymer (Pluronic F108 from BASF). After water rinsing the disc was blown dry with nitrogen. The water contact angle was 60 degrees. When a silicone rubber lid was placed over the disc with a hole over a channel, the droplet was not spontaneously drawn in. When a vacuum was applied to the channel through another hole in the lid, the droplet could however be introduced by suction.

B. Poly(Acrylamide) Coating.

a) Activation of the Surface.

A PET foil (polyethylene terephthalate, Melinex®, ICI), evaporation coated with a thin film of silicon oxide, was used as a lid. The silicon oxide side of the PET foil was washed with ethanol and thereafter UV/Ozone (UVO cleaner, Model no 144A X-220, Jelight Company, USA) treated for 5 minutes. 15 mm Bind silane (3-methacryloloxypropyl trimethoxysilane, Amersham Pharmacia Biotech), 1.25 ml 10% acetic acid and 5 ml ethanol was mixed and thereafter applied onto the foil using a brush. After evaporation of the solvent, the foil was washed with ethanol and blown dry with nitrogen. The water contact angle (sessile drop) was measured on a Ramé-Hart manual goniometer. The average of repeated measurements was 62 degrees.

b. Grafting Polyacrylamide to the Activated Surface 8.5 ml of 3 M acrylamide in water and 1.5 ml of 100 mM Irgacure 184 (dissolved in ethylene glycol, Ciba-Geigy) was mixed. The resulting solution was spread out on a quartz plate, and the activated PET foil was placed on top. The monomer solution was UV illuminated for 20 minutes through the quartz plate. The PET foil was then washed thoroughly in water and the average contact angle of repeated measurements was 17 degrees.

c. Capillary Wetting

A piece of room temperature vulcanizing silicone rubber (Memosil, Wacker Chemie) having a microchannel structure and two holes was placed onto the polyacrylamide grafted PET foil (lid) (according to b above). When a droplet of water was placed in the hole with a micropipette, the water was drawn in by capillary forces.

d. Comparative Example of Capillary Wetting

A piece of room temperature vulcanizing silicone rubber (Memosil, Wacker Chemie) having a microchannel pattern and two holes were placed onto the activated PET foil (lid) (according to a above). When a droplet of water was placed in the hole with a micropipette, no water was drawn in by capillary forces. When vacuum was applied to the channel through the other hole, the droplet was sucked into the channel.

The invention claimed is:

1. A microfluidic device being in a dry state that is capable of being rehydrated, said device comprises a set of one or more covered microchannel structures manufactured in the surface of a planar substrate, wherein each microchannel structures comprises:

a) more than one functional part wherein at least one of said functional parts is selected from the group consisting of a volume defining unit, a mixing cavity, and a waste cavity;

b) wherein reduced non-specific adsorption and hydrophilicity have been optimized by a coating exposing a non-ionic hydrophilic polymer on the surface of at least one of said at least one functional parts such that an aqueous liquid is capable of entering the functional part by self-suction when the liquid has passed the entrance of the functional part; and c) wherein the device is adapted for mass transport of solutes and/or particles between different functional parts of each microchannel structure by a liquid flow caused by non-electrokinetic forces.

2. The microfluidic device of claim 1, wherein the surface carrying the coat is made of organic material.

3. The microfluidic device of claim 1, wherein the surface of the planar substrate is made of plastics.

4. The microfluidic device of claim 3, wherein the plastics is based on a polymer of aliphatic monomers containing polymerizable carbon-carbon double bonds.

5. The microfluidic device of claim 4, wherein the monomer is selected from the group consisting of a cycloalkene, ethylene and propylene.

6. The microfluidic device of claim 5, wherein the cycloalkene is norbornene or substituted norbornene.

7. The microfluidic device of claim 1, wherein the non-ionic hydrophilic polymer is attached covalently directly to the surface or to a polymer skeleton that is attached to the surface.

8. The microfluidic device of claim 1, wherein the microfluidic device comprises more than five covered microchannel structures.

9. The microfluidic device of claim 1, wherein each microchannel structure comprises a microcavity having a volume $\leqq 1$ μl.

10. The microfluidic device of claim 1, wherein the device is a round disc.

11. The microfluidic device of claim 1, wherein the non-ionic hydrophilic polymer contains hydroxy groups, ethylene oxy groups, or amide groups.

12. The microfluidic device of claim 11, wherein the non-ionic hydrophilic polymer is a polyhydroxy polymer.

13. The microfluidic device of claim 11, wherein the non-ionic hydrophilic polymer comprises one or more blocks of polyoxyethylene chains.

14. The microfluidic device of claim 13, wherein the non-ionic hydrophilic polymer is polyethylene glycol.

15. The microfluidic device of claim 11, wherein the non-ionic hydrophilic polymer is polyethylene glycol which has a methoxy group at the end which does not bind to the part surface.

16. The microfluidic device of claim 11, wherein the non-ionic hydrophilic polymer comprises a plurality of amide groups.

17. The microfluidic device of claim 1, wherein the non-ionic hydrophilic polymer is selected from the group consisting of polysaccharides, water-soluble derivatives of polysaccharides, polyvinyl alcohols, and poly(hydroxy alkyl vinylether) polymers.

18. The microfluidic device of claim 1, wherein the non-ionic hydrophilic polymer is a reaction product between ethylene oxide and a dihydroxy or a polyhydroxy compound.

19. The microfluidic device of claim 1, wherein the non-ionic hydrophilic polymer a polymerisate/copolymerisate with monomers selected from the group consisting of acrylamide, methacrylamide and vinylpyrrolidone.

20. The microfluidic device of claim 1, wherein the non-ionic hydrophilic polymer is attached to a polymer skeleton that is attached to the part surface.

21. The microfluidic device of claim 20 wherein the attachment between the non-ionic hydrophilic polymer and the polymer skeleton is covalent.

22. The microfluidic device of claim 20, wherein the polymer skeleton is an organic polymer.

23. The microfluidic device of claim 20, wherein the skeleton is selected from the group consisting of cationic, anionic, and neutral polymers.

24. The microfluidic device of claim 20, wherein the skeleton is a polyamine.

25. The microfluidic device of claim 20, wherein the skeleton is a polyethylene imine.

26. The microfluidic device of claim 20, wherein the skeleton has a molecular weight 10,000-3,000,000 dalton.

27. The microfluidic device of claim 20, wherein the polymer skeleton is an inorganic polymer.

28. The microfluidic device of claim 1, wherein the surface of the planar substrate without the coat is made of plastics and the part surface without coat is hydrophilized by plasma treatment or by an oxidation agent in order to introduce functional groups that allow for a subsequent attachment of the coat onto the part surface.

29. The microfluidic device of claim 1, wherein the surface of the planar substrate is made of plastics and that the plastics has a non-significant fluorescence for excitation wavelengths in the interval 200-800 nm and emission wavelengths in the interval 400-900 nm.

30. The microfluidic device of claim 1, wherein the surface carrying the coat is made of inorganic material.

31. The microfluidic device of claim 1 further comprising functional parts of a detection cavity or a chamber for chromatography or a reaction microcavity.

32. A method of performing an analytical assay in a microchannel structure of the microfluidic device of claim 1 comprising the steps of:

(a) preparing a sample;

(b) transporting an analyte and reagents between different function parts of the microchannel structure by a liquid flow caused by non-electrokinetic forces and running the assay reaction within the device; and (c) detecting within the device the result of the assay reaction, wherein the result is a measure of an activity and/or a quantitative presence of an analyte in the sample.

* * * * *